United States Patent [19]
Kinzalow et al.

[11] Patent Number: 6,052,603
[45] Date of Patent: Apr. 18, 2000

[54] SYSTEM FOR INTERFACING A COMMUNICATION DEVICE WITH A RADIO FOR HANDS-FREE OPERATION

[75] Inventors: Richard M. Kinzalow, Northbrook; Lawrence Brownfield, Downers Grove; William D. Denison, Palos Hills; Sandra Kinzalow Calhoun, Park Ridge; David M. Arkin, Glenview; Klaus E. Nitz, Elmhurst, all of Ill.

[73] Assignee: Mold-Tech Plastics Limited Partnership, Chicago, Ill.

[21] Appl. No.: 08/932,522

[22] Filed: Sep. 18, 1997

Related U.S. Application Data

[63] Continuation of application No. 08/610,535, Mar. 4, 1996, abandoned, which is a continuation-in-part of application No. 08/419,893, Apr. 11, 1995, abandoned.

[51] Int. Cl.[7] ........................................ H04Q 7/32
[52] U.S. Cl. ............................ 455/557; 455/569; 455/90
[58] Field of Search ............................... 455/575, 90, 93, 455/95, 99, 15.5, 79, 116, 345, 346, 517

[56] References Cited

U.S. PATENT DOCUMENTS

| | | | |
|---|---|---|---|
| 2,554,657 | 5/1951 | Burstin | 455/89 |
| 3,541,555 | 11/1970 | Willie et al. | 343/720 |
| 5,243,640 | 9/1993 | Hadley et al. | 455/557 |
| 5,261,121 | 11/1993 | Hashimoto | 455/127 |
| 5,351,284 | 9/1994 | Rogers | 379/61 |
| 5,444,867 | 8/1995 | Marui et al. | 455/127 |
| 5,448,757 | 9/1995 | Hirata | 455/345 |
| 5,867,794 | 2/1999 | Hayes et al. | 455/557 |

FOREIGN PATENT DOCUMENTS

| | | | |
|---|---|---|---|
| 60-53331 | 3/1985 | Japan | 455/89 |
| 2 252 478 | 8/1992 | United Kingdom . | |
| 2 264 613 | 9/1993 | United Kingdom . | |

OTHER PUBLICATIONS

Thomas B. Schalk, "Voice Recognition in Cellular Mobile Telephones," Speech Technology, vol. 3, No. 3, pp. 24–28, Sep. (1986).

Karsten Ehlers, "Das Autoradio als Kern eines mobilen Kommunikationszentrums," NTZ, vol. 40, No. 6, pp. 444–449 (1987).

*Primary Examiner*—Edward F. Urban
*Attorney, Agent, or Firm*—Marshall, O'Toole, Gerstein, Murray & Borun

[57] ABSTRACT

An interface between a portable cellular phone and an automobile radio to allow hands-free operation of the phone is housed in a remote housing connected to a battery eliminator cigarette lighter adapter plug for simple installation into an automobile. The interface converts incoming signals from the cellular phone from audio frequency to radio frequency and transmits the signals to the existing automobile radio receiver, wherein the signals are reproduced over the radio speakers. The interface may also be used with a power conversion system to increase the power of the phone transmissions. Further, the interface may be used with any external communication source, such as a facsimile machine or laptop computer and modem. The interface is also easily adapted for use with any stand-alone audio producing devices, such as a cassette deck or compact disc player.

35 Claims, 13 Drawing Sheets

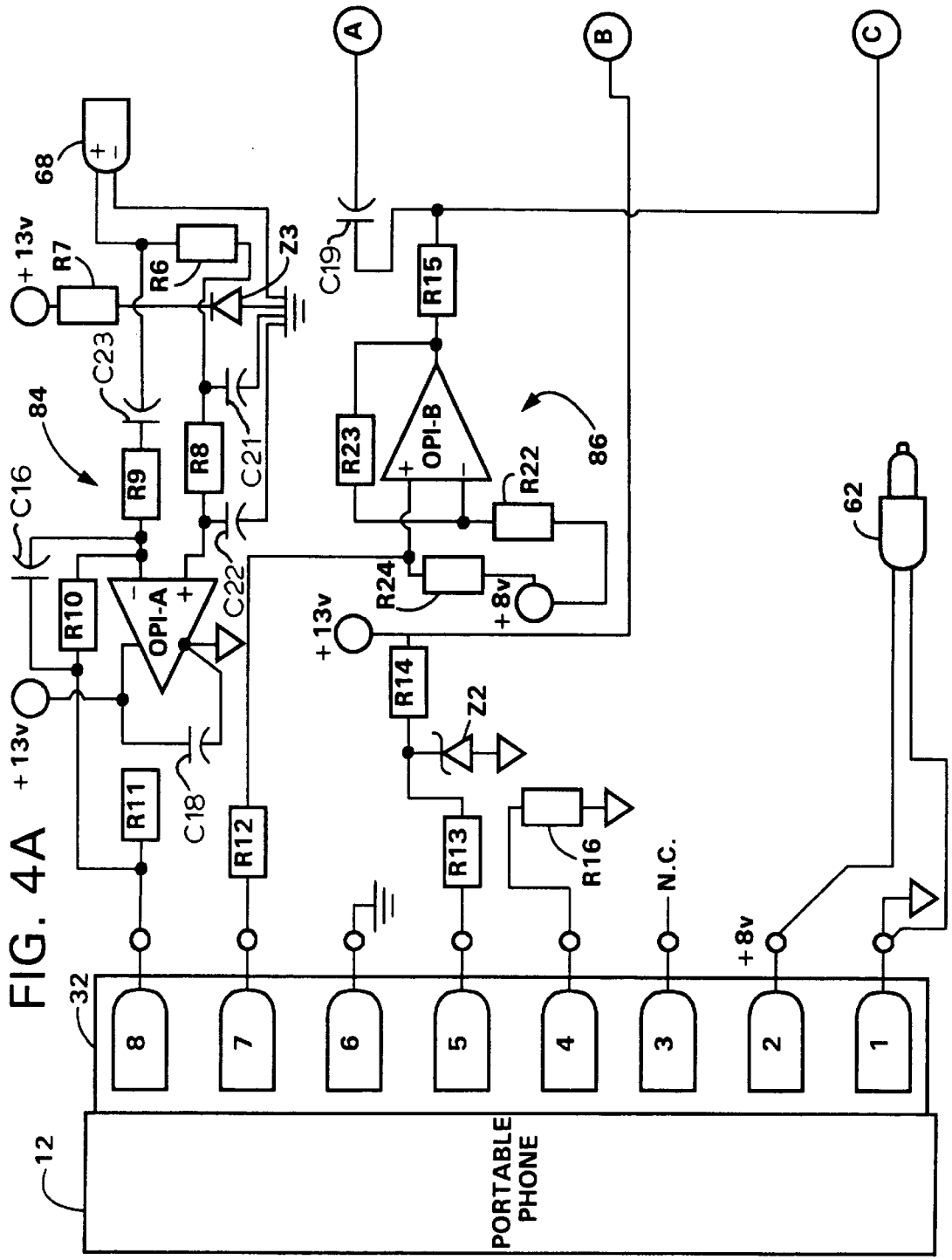

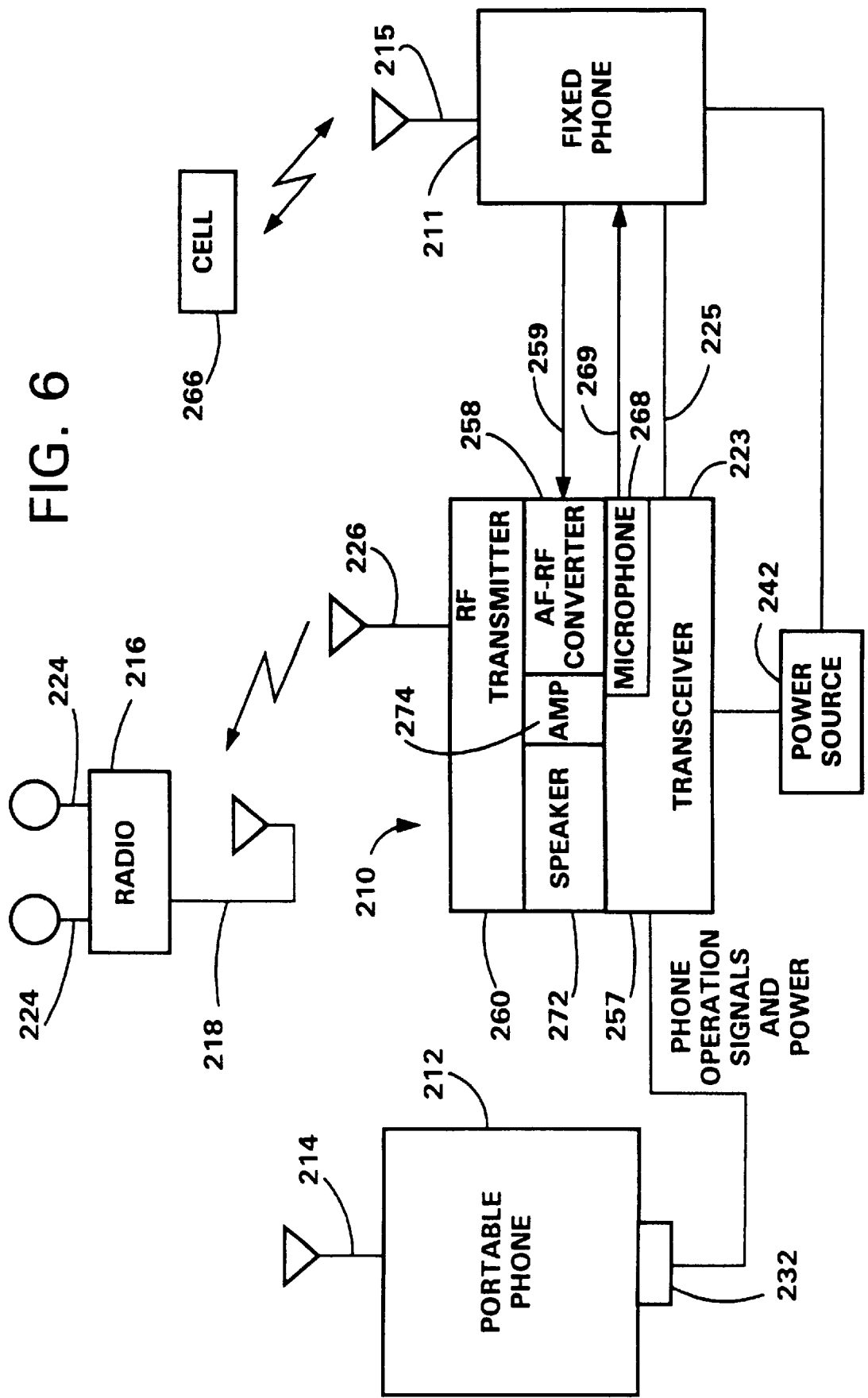

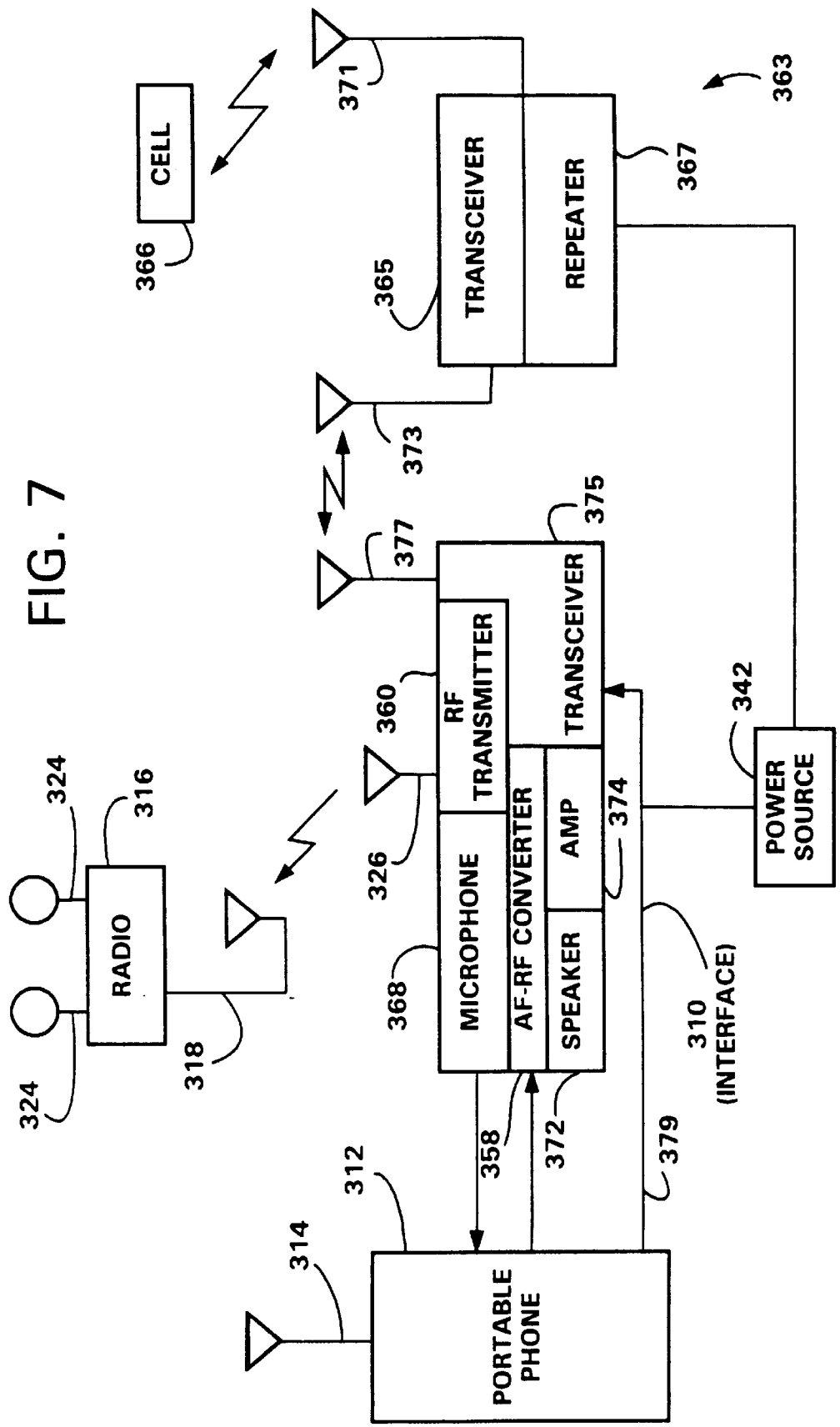

SYSTEM FOR INTERFACING A COMMUNICATION DEVICE WITH A RADIO FOR HANDS-FREE OPERATION

This is a Rule 62 Continuation of U.S. application Ser. No. 08/610,535, filed Mar. 4, 1996, now abandoned, which is a Continuation-in-Part of U.S. application Ser. No. 08/419,893 filed Apr. 11, 1995, now abandoned.

TECHNICAL FIELD

The present invention relates generally to a communications interface, and more particularly to an interface between an external communication source and an automobile radio.

BACKGROUND ART

External communication sources, such as portable cellular phones, have become increasingly popular and are used in many automobiles. Unfortunately, in order to use the phone, a user must hold the phone headset to his or her ear, which detracts from the ability of the user to properly and safely operate the automobile.

To overcome this problem, devices that allow for hands-free operation of a cellular phone in an automobile have been developed and are shown, for example, in Takano, U.S. Pat. No. 4,845,738 and Ono, U.S. Pat. No. 4,905,270. These prior art devices comprise a handset, typically installed near the driver's seat and into which the cellular phone can be inserted. The devices transmit incoming signals by wires from the cellular phone to an external amplifier and speaker system, which also must be installed somewhere inside of the automobile, most likely on the floor, the dashboard or in the trunk. Further, a microphone must also be installed in the automobile to transmit outgoing voice signals to the phone.

While these devices allow for hands-free operation of a cellular phone in an automobile, they have several drawbacks. Installation of the amplifiers, speakers, microphone and handset can be costly and time-consuming and is often too complicated for the average user. Also, such devices may crowd the inside of the automobile and interfere with safe and efficient operation thereof. Further, once the devices are installed, they are fixed in the automobile and are not easily removed. Thus, the devices are not portable and cannot be easily moved from one automobile to another.

Thus, there remains a need for a portable interface that allows hands-free operation of a cellular phone in an automobile without the need for external wires and components that involve costly and/or difficult installation and crowd the inside of the automobile.

SUMMARY OF THE INVENTION

An interface connectable to an external communication source for interfacing the source to a radio including a radio receiver and speaker comprises a converter which converts incoming audio signals from the source to radio frequency signals and a transmitter which transmits the radio frequency signals to the radio receiver, wherein the audio signals are reproduced over the radio speaker.

According to one aspect of the present invention, the interface also includes a microphone which receives an outgoing audio signal and transmits the outgoing signal to the external communication source and an amplifier and speaker which reproduces a signal generated by the external communication source when an incoming signal is received. The interface includes or is connectable to a battery eliminator to supply power to the external communication source from an external power source. The battery eliminator may also include a battery charger for charging an internal battery of the external communication source when the source is not in use. The interface may be housed in a cradle into which the external communication source may be inserted, in an adapter plug connectable between the source and the external power source, or in a remote housing connectable to the source and the external power source.

According to another aspect of the present invention, the interface may include a capacitor coupled between an interface antenna and the external power source.

According to yet another aspect of the present invention, the interface may include an annunciator which develops a tone when an incoming signal is received by the external communication source and means for delaying transmission of the incoming signal from the interface to the radio to allow for adjustment of the radio.

According to a further aspect of the present invention, the interface may include an RBDS transmitter for transmitting a command to activate and/or adjust an RBDS radio to a proper frequency to receive incoming signals from the external communication source. The interface may also include means for transmitting identification information to the radio, which may be reproduced over the radio speaker or displayed on a radio visual display panel. Still further, the interface may include voice recognition means to enable a user to control the external communication source and/or the radio through voice commands.

According to an alternative embodiment of the present invention, an interface is connectable between a portable cellular phone and a fixed cellular phone for interfacing the fixed phone to a radio including a radio receiver and a speaker. The interface includes a transceiver which receives phone operation signals from the portable phone and transmits the signals to the fixed phone, a converter which converts incoming audio signals from the fixed phone to radio frequency signals, and a transmitter which transmits the radio frequency signals to the radio receiver, wherein the audio signals are reproduced over the radio speaker.

According to a further alternative embodiment of the present invention, a system for interfacing a portable cellular phone to a radio includes a power converter which converts a signal between power levels and an interface connectable to the cellular phone. The interface includes a transceiver which communicates with the power converter and the cellular phone, a converter which converts incoming audio signals from the phone to radio frequency signals and a transmitter which transmits the signals for reproduction over the radio.

According to a still further embodiment of the present invention, an interface connectable to an audio producing device for interfacing the device to a radio including a radio receiver and a speaker comprises a converter which converts incoming audio signals from the audio producing device to radio frequency signals, a transmitter which transmits the radio frequency signals via an antenna to the radio receiver, wherein the audio signals are reproduced over the radio speaker, and a capacitor coupled between the antenna and an external power source which supplies power to the radio.

BRIEF DESCRIPTION OF THE DRAWINGS

FIGS. 4A and 4B, when joined in side-by-side fashion at the similarly lettered lines, comprise a schematic circuit diagram of the interface of FIG. 3;

FIG. 6 is a block diagram of an alternative embodiment of the interface of the present invention for use with the power conversion system of FIG. 5;

FIG. 7 is a block diagram of a further alternative embodiment of the present invention including an interface for interfacing a portable cellular phone with a radio and a power converter for boosting the power transmissions of the phone;

DETAILED DESCRIPTION

Figure 1:
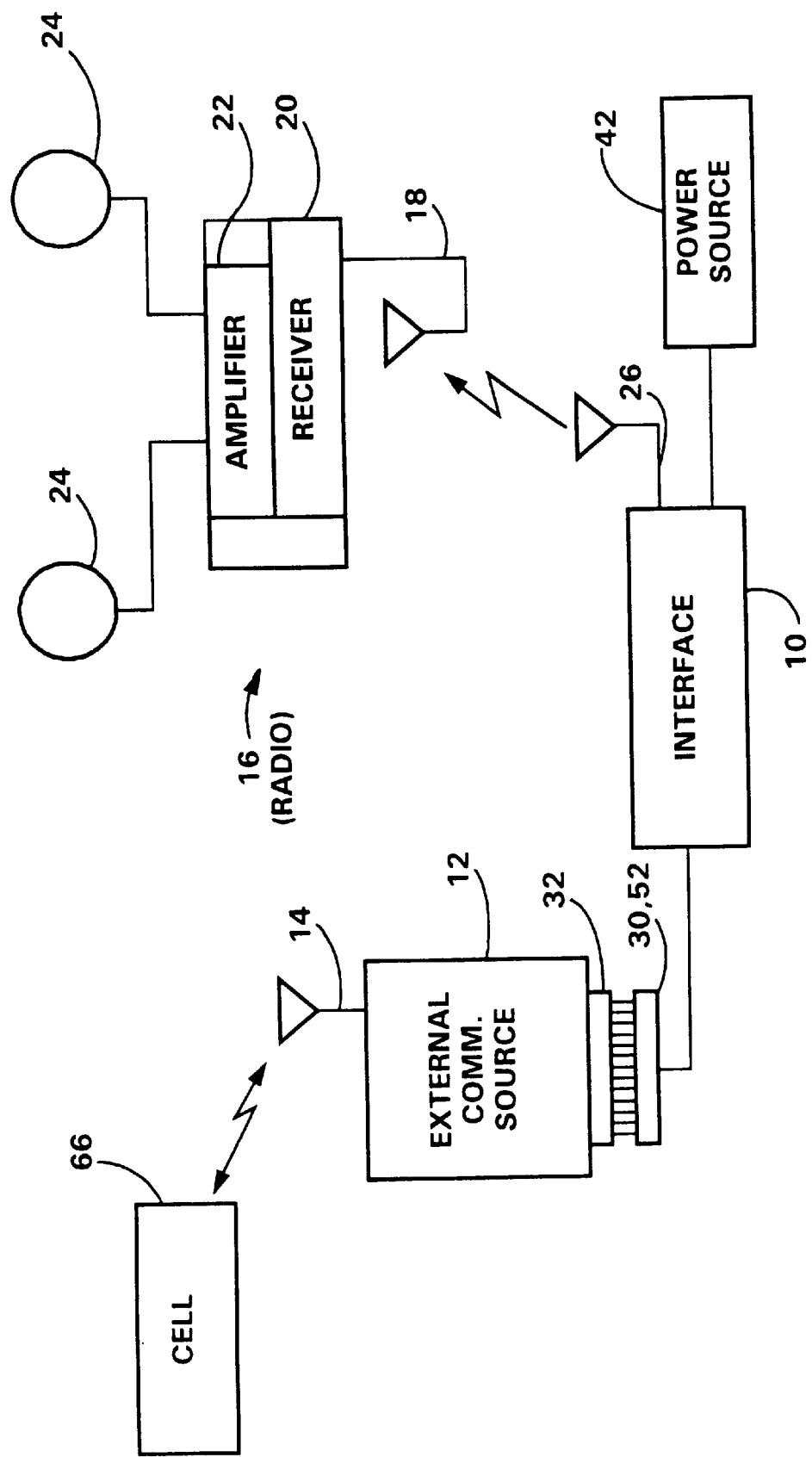
FIG. 1 is a block diagram of the external communication source to radio interface of the present invention in conjunction with associated apparatus.

Referring to FIG. 1, an interface 10 between a external communication source 12, such as a portable cellular phone with a phone antenna 14, and a radio 16 allows for hands-free operation of the phone 12. While the interface 10 is adapted for use with an automobile radio 16 to allow a driver or passenger of the automobile to operate the phone 12 hands-free, it should be noted that the interface 10 may alternatively be used in a different environment, if desired. Further, the invention is not limited to cellular phones and may be adapted for use with any other external communication source, such as a portable communication device like a laptop computer and modem, a facsimile machine or the like. Further, the interface is easily adapted for use with a stand-alone audio producing device, such as a cassette deck, a compact disc player, a navigational system, a video game, or the like.

The interface 10 is compatible with any standard radio 16, such as that found in most automobiles. The radio 16 includes a radio antenna 18, a receiver 20, an amplifier 22 and one or more speakers 24. The interface 10 also includes an antenna 26 which communicates with the radio antenna 18.

Figure 2A:
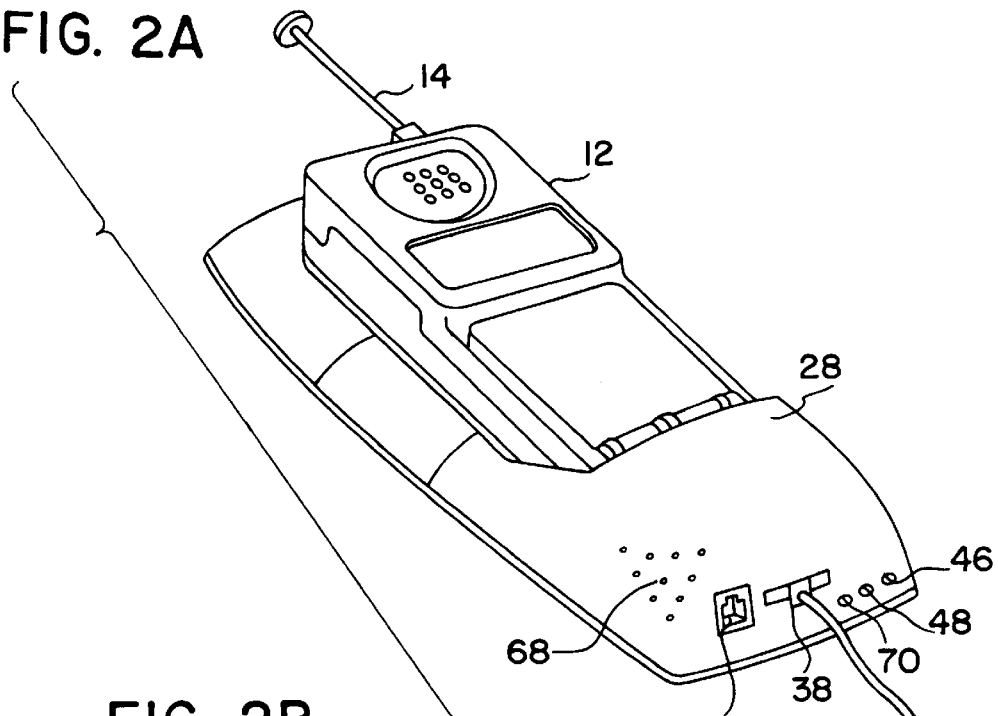
FIG. 2A is an isometric view of a cradle housing for the interface of the present invention, including a portable cellular phone inserted into the cradle.
Figure 2B:
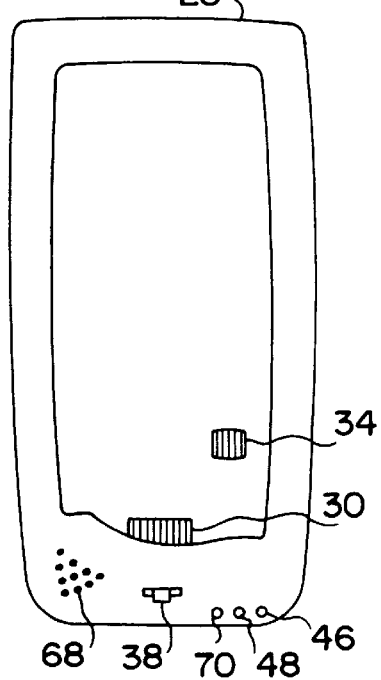
FIG. 2B is a fragmentary plan view of the cradle housing of FIG. 2A, excluding the portable cellular phone.

In one embodiment, as shown in FIGS. 2A and 2B, the interface 10 may be housed in a cradle 28 which may be attached to the inside of an automobile to keep the phone 12 from shifting within the automobile. The phone 12 is inserted into and held by the cradle 28 and a first connector 30 inside the cradle 28 is mated with an interface socket 32 (shown schematically in FIGS. 1 and 4A) of the phone 12. The cradle also includes a second connector 34 which mates with a power socket (not shown) on the phone 12. An existing battery eliminator plug 36 may be connected to a socket 38 on the cradle 28 via a cord 40 to supply power from an external power source 42, such as a car battery, to the cellular phone 12. The battery eliminator plug 36 may also include a battery charger to charge an internal battery 44 of the phone 12 via the second connector 34 on the cradle 28 when the phone 12 is not in use.

The cradle 28 may include additional features, such as a DC socket 46 capable of receiving power from a transformer to power the interface 10 and the phone 12 from a standard electrical outlet in a home or office. Also, the cradle 28 may include a socket 48 for receiving a monaural or stereo headphone plug.

Figure 2C:
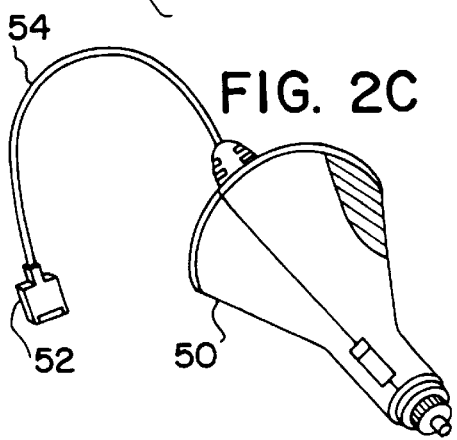
FIG. 2C is an isometric view of an alternative adapter plug housing for the interface of the present invention.

The interface 10 may alternatively be housed in an adapter plug 50, such as the one shown in FIG. 2C, which is connectable between the cellular phone 12 and the external power source 42. In this embodiment, the interface 10 is easily installed by inserting a connector 52 disposed on the end of a cord 54 into the interface socket 32 of the phone 12 and connecting the adapter plug 50 to the external power source 42.

The adapter plug 50 which houses the interface 10 and the battery eliminator plug 36 which connects to the cradle 28 may, for example, be insertable into an automobile cigarette lighter plug receptacle for supplying external power from an automobile battery or may alternatively be configured to connect to any other external power source.

Figure 2D:
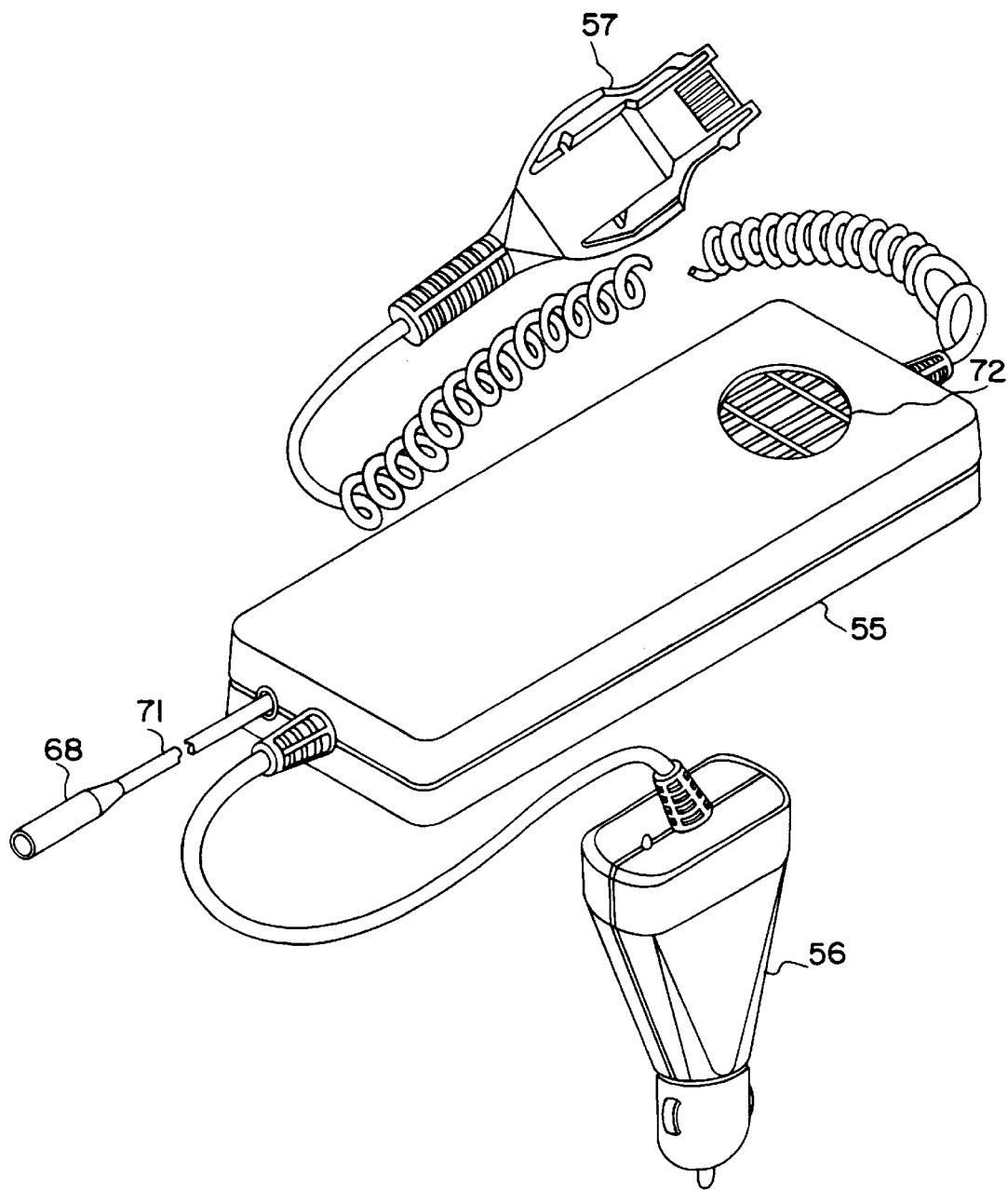
FIG. 2D is an isometric view of a further alternative remote housing for the interface of the present invention.

Referring to FIG. 2D, the interface 10 may also be incorporated into a remote housing 55 connected between a battery eliminator plug 56 and a phone connector 57 which is insertable into the interface socket 32 on the portable phone 12. The battery eliminator plug 56, which is substantially similar to the battery eliminator plug 36 shown in FIG. 2A, is insertable into the automobile cigarette lighter plug receptacle for supplying power from the automobile battery to the interface 10 and the portable phone 12.

As should be evident from the foregoing, the interface 10 may be housed in an adapter plug, a cradle or a remote housing or may include components in several of these structures or other structures. Further, the cradle 28, the adapter plug 50 and the remote housing 55 illustrated in FIGS. 2A–2D all allow the interface 10 to be easily installed in and removed from the automobile.

Figure 3:
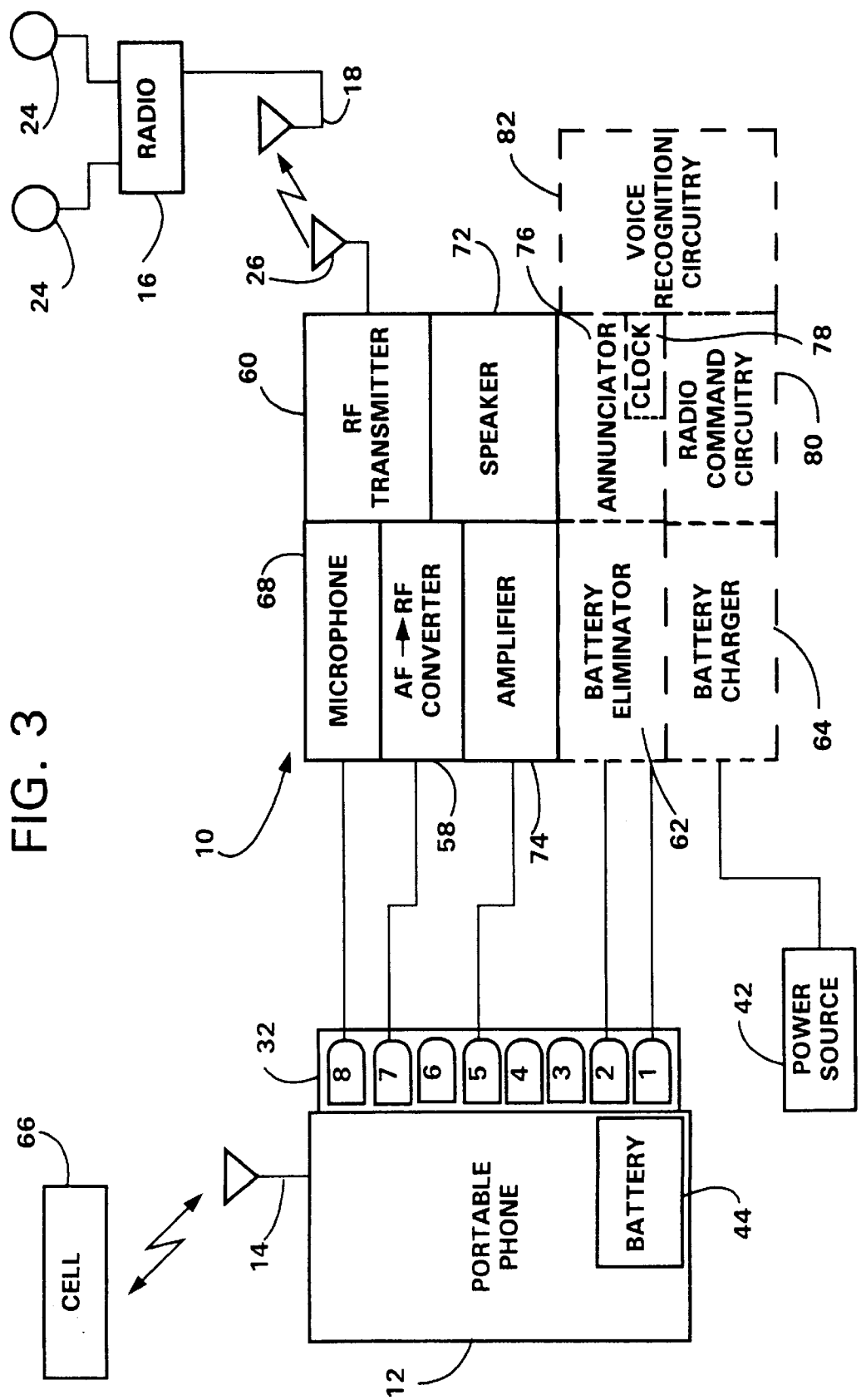
FIG. 3 is a block diagram of an embodiment of the interface of the present invention for use with a standard portable cellular phone, wherein alternative embodiment components are shown in dashed lines.

The interface of the present invention may be used with any portable cellular phone or with a portable phone and 3-watt power conversion system. FIG. 3 illustrates an embodiment of the interface 10 for use with a portable cellular phone, such as a Motorola PT series flip phone. The interface 10 includes an audio frequency to radio frequency converter 58 and a radio frequency transmitter 60. As noted above, the interface 10 may also include a battery eliminator 62 and a battery charger 64 or may be connectable to a separate battery eliminator and charger plug 36.

When the interface 10 is connected to the portable cellular phone 12, the phone 12 preferably receives power from the external power source 42 via the battery eliminator 62 to enable operation of the phone 12 without draining power from the internal phone battery 44. Further, when the phone 12 is not in operation, the battery charger 64 preferably charges the internal phone battery 52 so the phone 12 will be operational when the user disconnects the interface 10.

Incoming communication signals received by the phone antenna 14 from an external communications cell 66 are converted to audio signals by the phone 12 and sent to the interface 10, where the converter 58 converts the signals from audio frequency to radio frequency. The radio frequency signals are then transmitted by the radio frequency transmitter 60 to the radio receiver 20 via the interface antenna 26 and the radio antenna 18. In accordance with one embodiment, the transmitter 60 transmits the signals at a predetermined frequency for transmission over a selected FM or AM radio frequency. The signals are received by the radio antenna 18 and radio receiver 20, and are amplified by the radio amplifier 22 for reproduction over the radio speakers 24.

When the interface 10 is connected to the interface socket 32 of the phone 12, the phone's internal speaker (earpiece) and microphone (mouthpiece) are disabled and all audio signals are sent to the interface 10. A microphone 68 converts acoustic energy into electrical sound signals and provides the signals to the cellular phone 12, allowing the user to operate the phone 12 hands-free.

As shown in FIGS. 2A and 2B, the microphone 68 may be incorporated into the cradle 28 and/or the cradle 28 may include a socket 70 for connection to an external microphone that may be installed at some other location in the automobile. In the FIG. 2C embodiment of the interface 10, the microphone 68 may be incorporated into the adapter plug 50 or the cord 54. In the FIG. 2D embodiment of the interface 10, the microphone 68 may be connected to the remote housing 55 by a flexible wire which allows a user to optimally position the microphone 68. Alternatively, the microphone 68 may be linked to the phone 12 by wireless transmission or by a separate wire.

Referring again to FIG. 3, the interface 10 may also include a speaker 72 and a speaker amplifier 74 which reproduce the internal ringing of the phone 12 when an incoming call is received. Further, the speaker 72 and amplifier 74 provide a back-up for reproducing incoming voice signals if the radio 16 is not operational. Referring also to FIGS. 2A–2D, the speaker 72 and amplifier 74 may be housed in the cradle 28, the adapter plug 50 or the remote housing 55 or may be installed at some other location in the automobile.

The ringing reproduced over the speaker 72 alerts the user to activate and/or tune the radio 16 to a proper frequency to receive the incoming signals. After the radio 16 is properly adjusted, the driver activates the phone 12 to answer the call, such as by pressing a "send" button on the phone 12. To initiate an outgoing call, the driver adjusts the radio 16 to the proper frequency before dialing and sending the call.

The interface 10 may transmit signals to the radio 16 at any selected FM or AM radio frequency. The FCC strictly regulates the use of radio frequencies for all signals over 100 mW but the phone signals transmitted by the interface 10 fall below the FCC regulation range. To eliminate interference with other radio signals, the interface 10 may transmit the signals at a normally vacant frequency, such as 87.9, 88.1 or 88.3 MHz, that is unused by FCC radio signals.

According to an alternative embodiment of the invention, the interface 10 may include an annunciator 76 which develops a tone signal to alert the user when an incoming call is received by the phone 12. The interface 10 may also include a clock 78 which starts to run when the annunciator 76 first develops the tone. No signals will be transmitted from the interface 10 to the radio 16 until the clock 78 runs for a predetermined delay period, such as 10 seconds. The delay is provided for the user to adjust the radio 16 before incoming voice signals are transmitted from the interface 10. Thus, even if the user activates the phone 12 to answer the call before the radio 16 is adjusted, no signals will be transmitted before the user has time to adjust the radio 16.

According to a further alternative embodiment of the present invention, the interface 10 may include a radio command circuit 80 to develop operational commands for the radio 16. When the portable cellular phone 12 receives a call, the transmitter 60 sends a signal developed by the radio command circuit 80 to the radio receiver 20 to automatically activate, adjust the volume and/or tune the radio 16 to the appropriate frequency to receive the call. Further, if desired, a ringer tone developed by the phone 12 when an incoming call is received may be transmitted by the interface 10 to the radio 16 for reproduction over the radio speakers 24 to alert the user of the incoming call, eliminating the need for the speaker 72 and amplifier 74 and the annunciator 76 in the interface 10. When the user hears the ringing over the radio speakers 24, the user simply activates the phone 12 to receive the call.

Similarly, when an outgoing call is initiated by the user, the radio command circuit 80 and transmitter 60 may signal the radio receiver 20 to activate and/or adjust the radio 16 to the appropriate frequency so that signals received by the phone 12 can be heard over the radio 16.

According to another alternative embodiment of the invention, the interface 10 may transmit the signals to the radio receiver 20 at the intermediate FM frequency of the radio (10.7 MHz). The intermediate frequency signals override other radio signals and allow for transmission over any radio output frequency, eliminating the need to adjust the radio 16 to a particular frequency.

Further, the radio command circuit 80 may receive caller identification information, such as the number from which the call originated, from the phone 12 and the transmitter 60 may transmit the information to the radio 16 before the driver answers an incoming call. This information may then be reproduced over the radio speakers 24 or displayed on a visual display panel of the radio 16. The radio command circuit 80 may also include a memory to store the caller identification information.

If desired, the interface 10 may also include a voice recognition circuit 82 which would allow the driver to dial, send and receive calls by voice commands and allow completely hands-free operation and control of the portable cellular phone 12. Further, the voice recognition circuit 82 may be connected to the radio command circuit 80 to allow the user to adjust and control the radio 16 through voice commands.

The external communications cell 66 may include a voice recognition system wherein once the user activates the phone 12 to connect to the cell 66, the user may dial the phone 12 through voice commands which are interpreted by the cell 66. The interface 10 of the present invention is compatible with this type of voice recognition system without the use of the voice recognition circuit 82. If the cell 66 returns a signal to the phone 12, the signal will be reproduced over the radio 16.

Figure 4B:
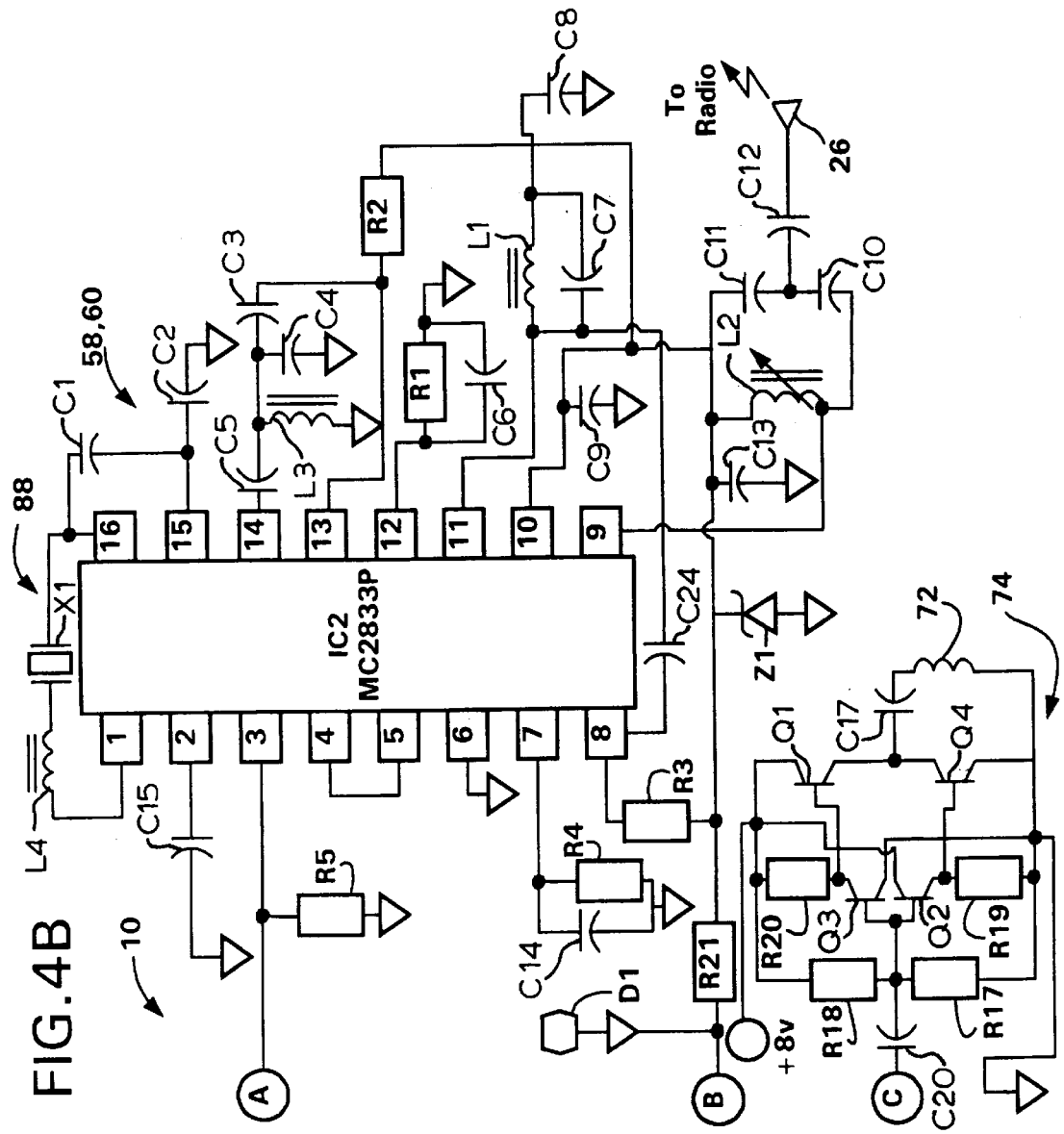

FIGS. 4A and 4B, when joined in side-by-side fashion at the similarly lettered lines, together comprise a circuit diagram of the FIG. 3 embodiment of the interface 10, including the microphone 68 and speaker 72, as designed for specific use with a Motorola PT series flip phone and transmission to the radio 16 at a frequency of 87.9 MHz. Component values/descriptions are set out below, it being understood that such values and the particular integrated circuits shown in FIGS. 4A and 4B are merely exemplary in the sense that other components could alternatively be used in accordance with the present invention. Further, the circuit could easily be modified by one skilled in the art for transmission at any AM or FM frequency or for compatibility with any other portable cellular phone, including phones manufactured by Nokia, GE, Mitsubishi, Oki, Panasonic, Bosch or others.

| Name | Description |
|---|---|
| IC2 transmitter | Motorola MC2833P narrow-band |
| OP1-A & B | LM358 Dual operational amplifier |
| Q1, Q2 | 2N4401 NPN transistor |
| Q3, Q4 | 2N4403 PNP transistor |
| Z1, Z2 | 5.6 volt zener diode |
| Z3 | 8 volt zener diode |
| D1 | 1N4002 diode |
| C1 | 34 pf capacitor |
| C2 | 33 pf capacitor |
| C3, C4 | 68 pf capacitor |
| C5 | 47 pf capacitor |
| C6, C9, C14 | 470 pf capacitor |
| C7, C16, C24 | 10 pf capacitor |
| C8, C12 | 1000 pf capacitor |
| C10 | 18 pf capacitor |
| C11 | 100 pf capacitor |
| C13, C19, C20, C21, C22, C23 | 1 $\mu$f capacitor |
| C15 | 4700 pf capacitor |
| C17, C18 | 100 $\mu$f capacitor |
| L1, L3 | 136 nH inductor |
| L2 | adjustable inductor (~210 nH) |
| L4 | 1 $\mu$H inductor |
| R1, R14 | 1 K$\Omega$ resistor |
| R2 | 390 K$\Omega$ resistor |
| R3 | 270 K$\Omega$ resistor |
| R4 | 150 K$\Omega$ resistor |
| R5, R17, R18, R21 | 47 K$\Omega$ resistor |
| R6 | 5.6 K$\Omega$ resistor |
| R7 | 500 $\Omega$ resistor |
| R8, R19, R20 | 2.7 K$\Omega$ resistor |
| R9, R22, R23 | 10 K$\Omega$ resistor |
| R10 | 442 K$\Omega$ resistor |
| R11, R12, R13, R15 | 200 $\Omega$ resistor |
| R16 | 56 K$\Omega$ resistor |
| R21 | 560 $\Omega$ resistor |

Referring to FIGS. 4A and 4B, the interface 10 is connected to the portable phone 12 by the phone interface socket 32, which comprises eight pins. Pins 1 and 2 are connected to the battery eliminator 62 (or to a separate battery eliminator plug 36) to supply power to the phone 12 and the interface 10. In order to disable the internal speaker and internal microphone of the portable cellular phone 12, pin 4 is connected to ground through pull-down resistor R16 and a constant five volt source is provided to pin 5 via the simple shunt regulator comprising resistors R13 and R14 and zener diode Z2. When pin 4 and pin 5 are terminated as described above, the internal speaker and microphone of the phone 12 are disabled and access to these functions becomes available at pins 7 and 8. Specifically, the outgoing audio signals from the user are provided to pin 8 and the incoming signals that would normally be reproduced at the earpiece of the phone 12 are provided to pin 7.

The microphone 68 is connected to pin 8 of the phone interface socket 32 through the microphone amplifier circuit 84. A Motorola PT series phone requires that the input to pin 8 be an audio signal of approximately 0 to 0.5 volts peak-to-peak with an 8 volt DC bias. The zener diode Z3 and current limiting resistor R7 provide a constant voltage supply for the microphone 68. Diode Z3 is also used to develop an 8 volt bias noiseless reference voltage to the inverting amplifier OP1-A through the RC filter comprised of capacitors C21 and C22 and resistor R8.

The AC signal generated by the microphone 68 passes through the DC blocking capacitor C23 and is amplified by the inverting amplifier OP1-A, the gain of which is determined by the values of resistors R9 and R10. Capacitor C16 stabilizes the microphone amplifier circuit 84 from the effects of input capacitance and resistor R11 stabilizes the effects of output capacitance to reduce the tendency of the high gain amplifier circuit 84 to oscillate.

All input circuitry grounds are summed together at the analog ground pin 6 of the phone interface socket 32. However, the ground of amplifier OP1-A is connected to the power ground pin 1 of the interface socket 32. This grounding route eliminates hiss and hum noise in the interface circuit.

The incoming audio signal at pin 7 of the phone interface socket 32, which normally would be transmitted to the earpiece of the phone 12, is connected to pin 3 of a transmitter chip IC2 through a signal buffer circuit 86. The buffer circuit 86 comprises the non-inverting amplifier OP1-B referenced to the +8 volt supply. The resistor R12 provides current limiting protection for the input to the amplifier OP1-B and the resistor R24 provides a pull-up for the signal present at pin 7. The resistor R22 controls the gain of the amplifier OP1-B to amplify the incoming audio signal for modulation by the transmitter chip IC2. The resistor R15 isolates the output of the amplifier OP1-B from the capacitor loading of capacitors C19 and C20. The output of the amplifier OP1-B is AC coupled to the input of the speaker amplifier 74 through capacitor C20 and is also connected to pin 3 of the transmitter chip IC2 through capacitor C19.

The speaker amplifier 74 is a current amplifier with relatively high input impedance and low output impedance to drive the 8 ohm load of the speaker 72. The resistors R17 and R18 place the DC bias of the input to the speaker amplifier 74 at one-half of the +8 volt supply value. Transistor Q2 and resistor R19 form a voltage follower referenced to ground and transistor Q3 and resistor R20 form a voltage follower referenced to the +8 volt supply. The output of the two cross-coupled followers Q2, R19 and Q3, R20 is connected to a complimentary follower comprising transistors Q4 and Q1 at the second stage of the amplifier 57. The AC component of the signal is pushed and pulled through the capacitor C17 and across the voice coil of the speaker 72. The speaker amplifier 74 and speaker 72 reproduce the ringing of the phone 12 when an incoming call is received and also provide a back-up system for reproducing incoming voice signals received by the phone 12 if the radio 16 is non-operational.

The transmitter chip IC2 is an MC2833P narrow-band transmitter manufactured by Motorola. The chip was designed to function primarily in cordless telephones in the 49 Mhz frequency band, but the circuit component values have been altered to allow the transmitter to operate near the FM broadcast band. The transmitter chip IC2, with associated circuitry, comprises the audio frequency to radio frequency converter 58 and the radio frequency transmitter 60 of the interface 10.

The transmitter chip IC2 is coupled to the crystal oscillator 88 formed by crystal X1, inductor L4 and capacitors C1 and C2. The output of the oscillator 88, which operates at 22.025 Mhz, is buffered and appears at pin 16 of the transmitter chip IC2. Pin 3 of the transmitter chip IC2 forms the input to an internal variable reactance circuit. The incoming audio signal from the signal buffer circuit 86 applied to pin 3 mixes with the output of the crystal oscillator 88 to FM modulate the audio signal on the oscillator carrier. The output is then connected to a frequency doubler circuit formed by capacitors C3, C4 and C5 and inductor L3. The output of the frequency doubler feeds into the base of an internal radio frequency transistor amplifier at pin 13 of the transmitter chip IC2. The internal amplifier, in combination with capacitors C6 and C7, resistors R1 and R7, and inductor L1, forms a second frequency doubler circuit, the output of which is fed through the DC blocking capacitor C12 into a last stage amplifier at pin 8 of the transmitter chip IC2.

The last stage amplifier, which includes an internal radio frequency transistor and associated resistors R2 and R3, capacitors C10, C11 and C13 and inductor L1, comprises a linear amplifier having an output which appears at pin 9 of the transmitter chip IC2. This output is connected to the inductor L2, which is tuned for maximum radio frequency output. The signal then passes through the capacitor C12 to the antenna 26 for transmission to the radio 16. The output center frequency of the crystal (22.025 mhz) is thus multiplied four times for final transmission to the radio 16 at 88.1 Mhz.

Power for the transmitter chip IC2 is supplied through diode D1, resistor R21 and the voltage developed across zener diode Z1. The Motorola chip MC2833P is designed to run on any voltage from 2.5 to 9 volts. The output power of the transmitter could be adjusted by changing the voltage of zener diode Z1.

Figure 5:
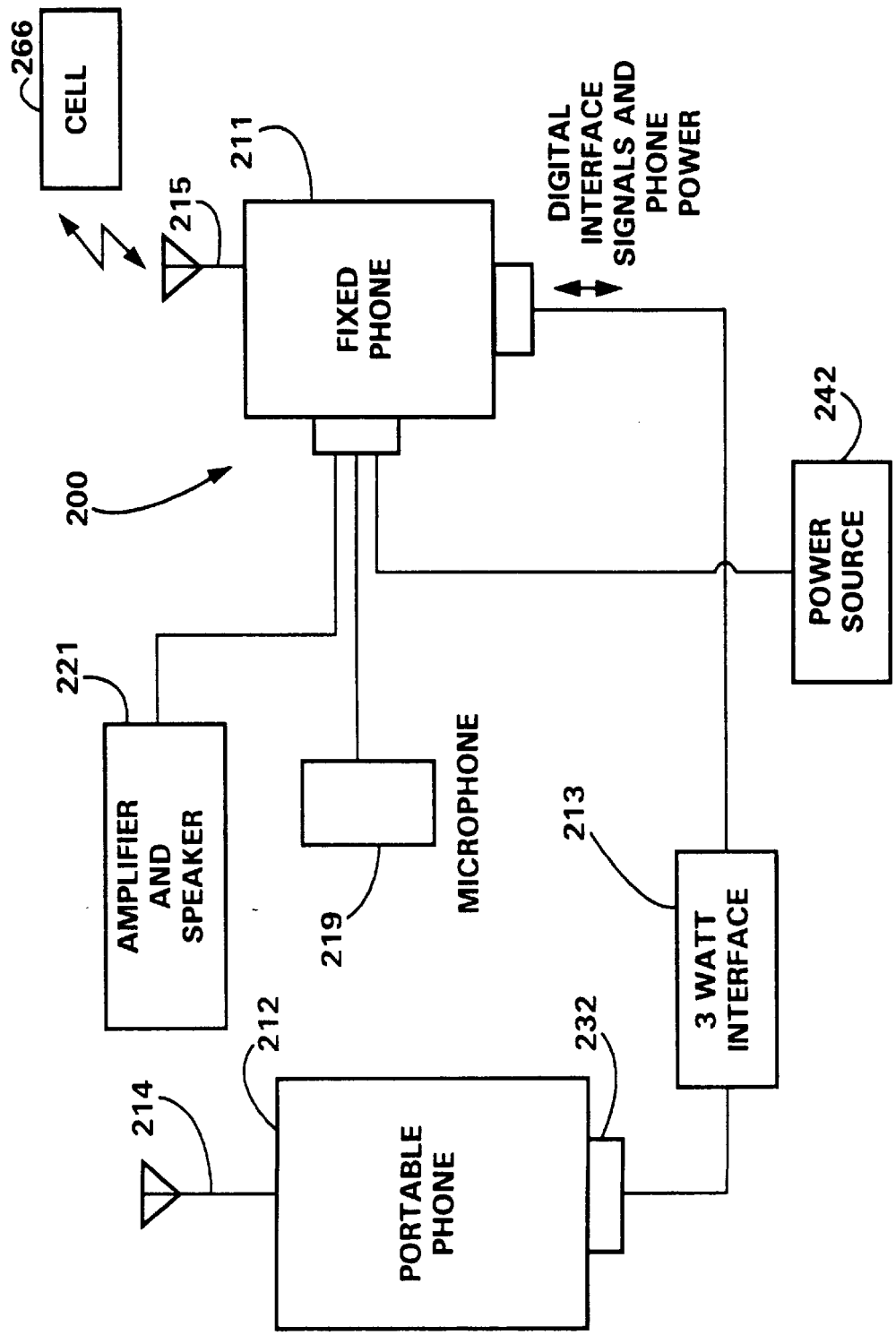
FIG. 5 is a block diagram of a prior art 3 watt fixed phone power conversion system for use with a portable cellular phone.

Portable cellular phones have low power transmission capability (typically 0.6 watts) and many manufacturers offer systems to boost the transmissions to and from the cellular phone to 3-watts. FIG. 5 illustrates a typical power conversion system 200 for use with a portable cellular phone 212.

The power conversion system 200 comprises a fixed cellular phone 211 with 3 watt transmission capabilities which is hard-wired to a portable cellular phone 212 via a 3 watt interface 213 connected to an interface socket 232 of the portable phone 212. The fixed phone 211 is typically remotely installed, for example, in the trunk of the automobile and is connected to an external power source 242, such as the automobile battery, to supply power to the fixed phone 211. Once the fixed phone 211 is installed, phone transmissions occur exclusively between the fixed phone 211 and an external communications cell 266 via an external antenna 215 of the fixed phone 211. An antenna 214 of the portable phone 212 is disabled and the portable phone 212 operates exclusively as the user interface to the fixed phone 211.

Figure 5A:
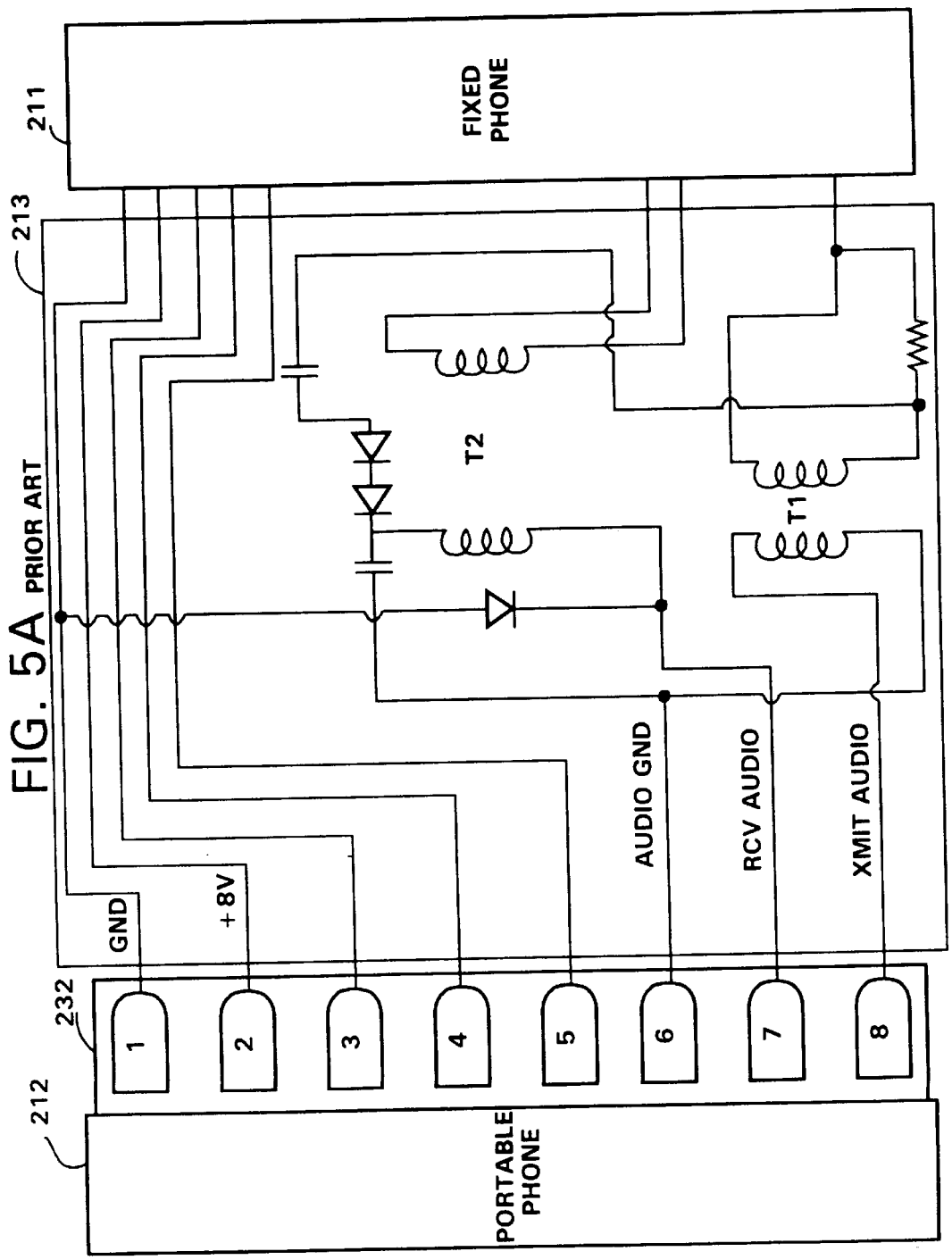
FIG. 5A is a schematic diagram of the prior art 3 watt interface of FIG. 5.

FIG. 5A is a schematic diagram of the prior art 3 watt interface 213 connected between the portable phone 212 and the fixed phone 211. User keypad input signals and other digital phone operation signals are transmitted from pins 3, 4 and 5 of the portable phone interface socket 232 to the fixed phone 211 via the 3 watt interface 213. The 3-watt interface 213 also supplies power from the fixed phone 211 to the portable phone 212 via pin 2 of the interface socket 232. Further, the 3 watt interface 213 comprises transformers T1 and T2 which isolate the audio signals provided at pins 7 and 8 of the portable phone interface socket 232 and transmit the signals to the fixed phone 211.

Hands-free operation of the fixed phone power conversion system 200 can be accomplished by installing an external microphone 219 for transmitting outgoing voice signals to the fixed phone 211, and an external amplifier and speaker 221 for reproducing incoming signals from the fixed phone 211. Both the microphone 219 and the speaker 221 must be hard-wired to the fixed phone 211 and installed inside the automobile.

The present invention may be adapted for use with a 3 watt power conversion system like the one shown in FIG. 5. Referring to FIG. 6, according to an alternative embodiment of the present invention, an interface 210 is connectable between the portable phone 212 and the fixed phone 211. The interface 210 transmits incoming voice signals from the fixed phone 211 to a radio 216, eliminating the need to install the external amplifier and speaker 221 to allow for hands-free operation.

The interface 210 is similar to the interface 10 of FIG. 3 in that it comprises an audio frequency to radio frequency converter 258, a radio frequency transmitter 260 and an antenna 226 to communicate with the radio 216. The interface 210, however, also includes a transceiver 223 which replaces the 3 watt interface 213 of FIGS. 5 and 5A and connects the portable phone 212 to the fixed phone 211. The interface socket 232 of the portable phone 212 is connected to the interface 210 and the interface 210 is connected by a wire 225 to the fixed phone 211. In the FIG. 2A embodiment of the interface, the cradle 28 may include a socket 227 which receives the wire 255 for connection to the fixed phone 211.

The transceiver 223 receives phone operation signals from the keypad or memory of the portable phone 212 and transmits the signals to the fixed phone 211. The phone operation signals include, for example, the identification calling number of the portable phone 212, pre-programmed phone numbers stored in memory and keypad input signals from the user.

The interface 210 and fixed phone 211 are connected to the external power source 242 which supplies power to the fixed phone 211 and interface 210. Power is supplied to the portable phone 212 from the fixed phone via the wires 225.

Alternatively, the interface 210 could be used in conjunction with the existing 3 watt interface 213 of FIGS. 5 and 5A and not include the transceiver 223. The interface 210 of FIG. 6 (less transceiver 223) could be connected solely to the fixed phone 211 in place of the external microphone 219 and amplifier and speaker 221 shown in FIG. 5.

Referring again to FIG. 6, the interface 210 also includes a speaker 272 and amplifier 274 to reproduce the internal ringing of the fixed phone 211 when an incoming call is received. Incoming voice signals are received by the fixed phone 211 from the external communications cell 266 and are converted to audio signals. The incoming audio signals are then transmitted from the fixed phone 211 to the converter 258 of the interface 210 via a wire 259. The converter 258 converts the incoming signals from audio frequency to radio frequency and the transmitter 260 transmits the radio frequency signals to the radio 216 via the interface antenna 226. The signals are then reproduced over the radio speakers 224. A microphone 268 receives outgoing voice signals from the user and transmits the outgoing voice signals to the fixed phone 211 via a wire 269 for transmission to the external communication cell 266. The wires 259 and 258 may also be connected to the interface via socket 227 (FIG. 2A).

According to a further alternative embodiment of the present invention, as shown in FIG. 7, an interface 310 may be adapted for wireless communication with a power converter 363 to increase the power of the transmissions to and from a portable cellular phone 312. The power converter 363, which receives power from an external power source 342, comprises a transceiver 365 and a repeater 367 installed, for example, in the trunk of the automobile. The power converter 363 also includes an external antenna 371 for communicating with an external communications cell 366 and an internal antenna 373 for communicating with the interface 310. The interface 310 includes an audio frequency to radio frequency converter 358, a radio frequency transmitter 360 and a first antenna 326 for communicating with a radio 316 via a radio antenna 318. The interface 310 further includes a transceiver 375 and a second antenna 377 for communicating with the power converter 363.

Outgoing voice signals are transmitted from a microphone 368 to the portable cellular phone 312. The outgoing signals are then sent from the phone 312 to the interface transceiver 375 via a wire 379. The interface transceiver 375 transmits the signals to the power converter 363 via the antennas 377 and 373. The signals are received by the transceiver 365, amplified by the repeater 367 and transmitted via the external antenna 371 to the external communications cell 366.

Incoming communications signals from the external cell 366 are received by the power converter 363 via the external antenna 371 and the transceiver 365. The signals are then amplified by the repeater 367 and transmitted via the internal antenna 373 to the interface transceiver 375 via the second antenna 377 and are subsequently sent via the wire 379 to the phone 312. The phone 312 converts the signals to audio signals and the audio signals are sent to the interface converter 358 for conversion to radio frequency signals. The transmitter 360 then transmits the radio frequency signals via the antenna 326 to the radio 316 for reproduction over the radio speakers 324.

The operation and advantages of the interface 210 of FIG. 6 and the interface 310 and power converter 363 of FIG. 7 are not significantly affected by the physical layout of the components. The power converter 363 may be installed in the trunk or anywhere inside of the automobile. The interface 210 or 310 may be housed in a cradle or an adapter plug or may contain components in both of these or other structures. Further, the microphone 268 or 368 and the speaker 272 or 372 may be housed with the interface or may be installed at some other location in the automobile.

Further, the interface 210 of FIG. 6 and the interface 310 of FIG. 7 may include the optional features described in connection with the interface 10 of FIG. 3, such as an annunciator and clock, radio command circuitry or voice recognition circuitry.

Figure 8:
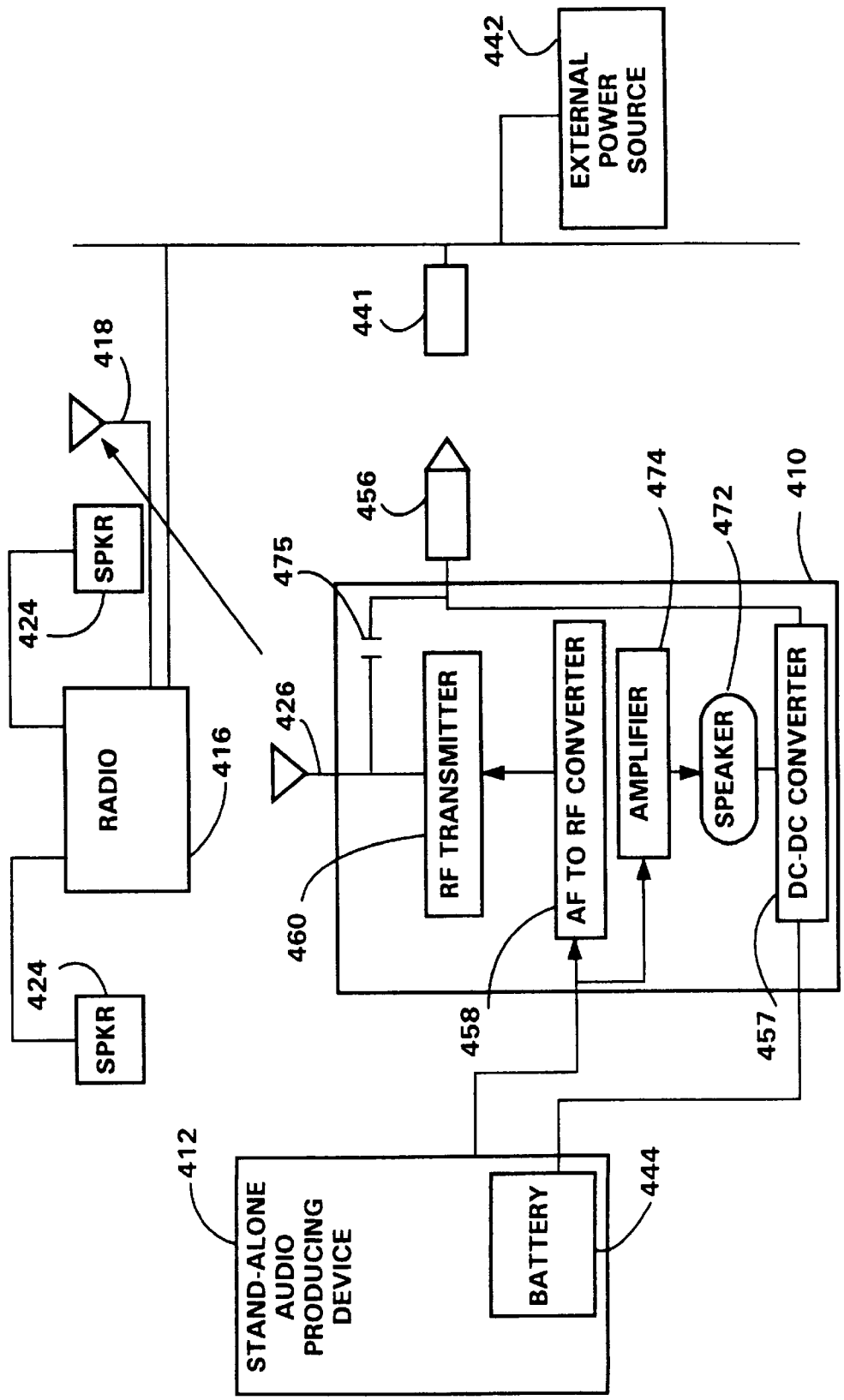
FIG. 8 is a block diagram of another embodiment of the present invention including an interface for interfacing a stand-alone audio producing device with a radio.

FIG. 8 is a block diagram of another embodiment of the present invention wherein an interface 410 is connectable between a stand-alone audio producing device 412 and an external power source 442, such as an automobile battery. The audio producing device 412 may be a cassette deck, compact disc player, video game, navigational computer, digital computer, or the like. The interface 410 receives audio signals from the audio producing device 412, converts the audio signals to radio frequency and transmits the radio frequency to a radio 416 for reproduction over one or more radio speakers 424.

The audio output from the audio producing device 412 is transmitted (via, for example, a wire) to an audio frequency to radio frequency converter 458 contained in the interface 410. The converter 458 converts the audio signals to radio frequency and a radio frequency transmitter 460 transmits the signals to the radio 416 via an interface antenna 426. The signals are received by the radio 416 via a radio antenna 418 and are reproduced over the radio speakers 424. The radio frequency transmitter 460 preferably transmits the signals to the radio 416 at a normally vacant frequency, such as 88.1 MHz.

The interface 410 may also include a speaker 472 and a speaker amplifier 474 which also receives the audio output signals from the audio producing device 412. The amplifier 474 and speaker 472 temporarily reproduce the audio signals received from the audio producing device 412 so that the user can adjust the radio 416 to the proper frequency for receiving the signals from the radio frequency transmitter 460.

A battery eliminator plug 456 connected to the interface 410 is insertable into an automobile cigarette lighter plug receptacle 441 for connecting the interface 410 to the external power source 442. The interface 410 also includes a DC—DC converter 457 which provides power to the various components of the interface and which may be connected to a battery 444 of the audio producing device 412 to supply power to the audio producing device 412. Alternatively, the DC—DC converter 457 need not supply power to the device and/or may be incorporated into the battery eliminator plug 456.

The interface 410 also includes a capacitor 475 coupled between the interface antenna 426 and the battery eliminator plug 456. The capacitor couples the radio frequency signals generated by the RF transmitter 460 to the connection between the external power source 442 and the radio 416. The connection between the external power source 442 and the radio 416 functions as an additional antenna, which is completely enclosed in the automobile. Thus, the capacitive coupling greatly reduces any stray emissions of the signals outside of the automobile. Preferably, the value of the capacitor 475 is in the range of about 100 pF. It should be noted that the capacitive coupling described above may be incorporated into any of the disclosed embodiments of the present invention.

Figure 9:
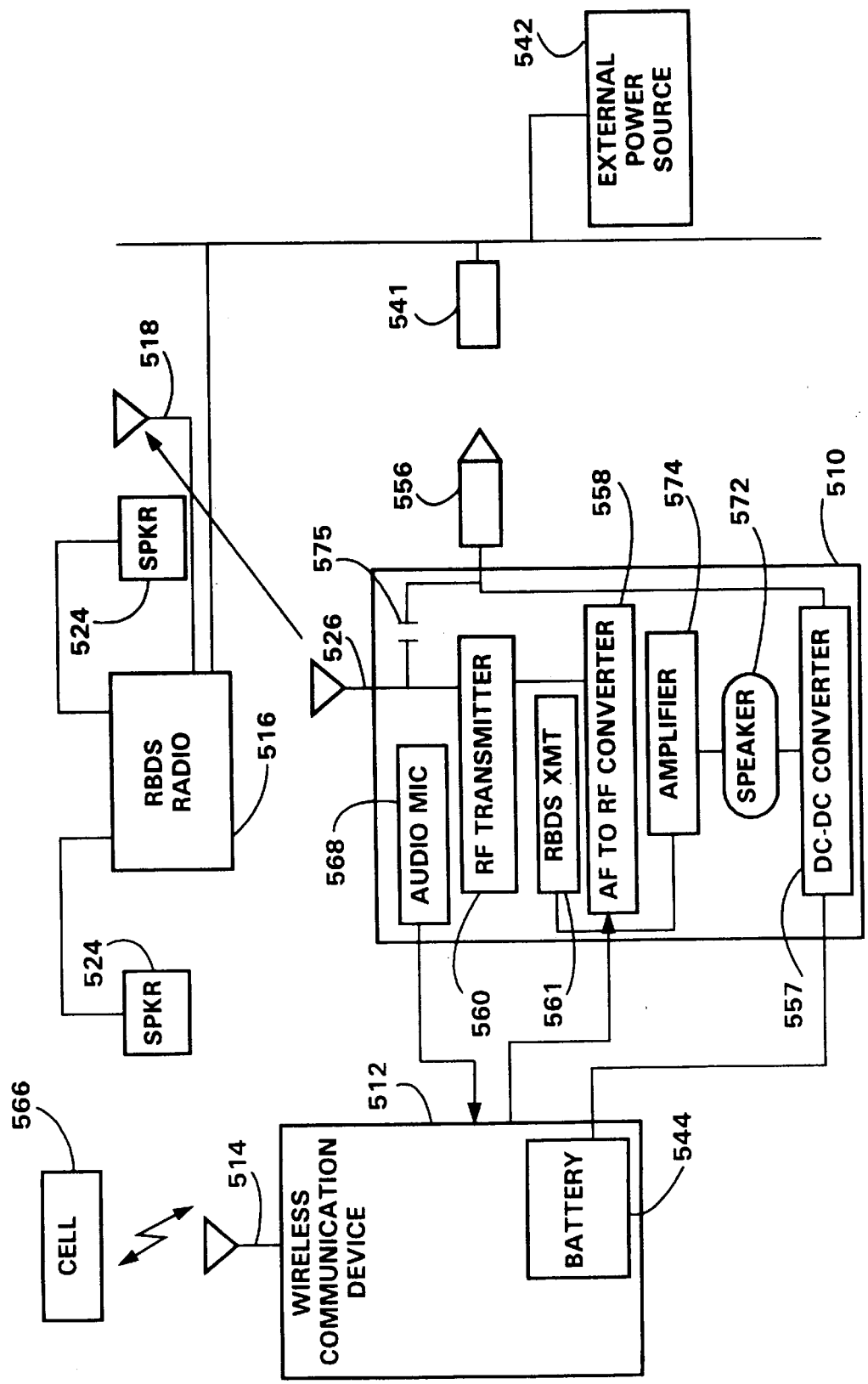
FIG. 9 is a block diagram of yet another embodiment of the present invention including an interface for interfacing a external communication source with a Radio Broadcast Data System radio.

FIG. 9 is a block diagram of yet another embodiment of the present invention wherein an interface 510 is compatible with an Radio Broadcast Data System (RBDS) radio 516. The RBDS radio 516 is capable of receiving digital signals which may include information, such as a name of a song being broadcast, that may be displayed on a display panel (not shown) incorporated into the RBDS radio 516. Further, the RBDS radio 516 may also receive digital command signals which automatically turn on the RBDS radio 516, and/or adjust the frequency and/or volume of the RBDS radio 516.

Similar to the other embodiments of the present invention described above, the interface 510 is connectable to a wireless communication device 512, such as a portable phone or the like which communicates with an external cell 566 via an antenna 514. The interface 510 includes an audio frequency to radio frequency converter 558 which receives audio output from the wireless communication device 512 and converts the audio signals to radio frequency. A radio frequency transmitter 560 then transmits the signals to the RBDS radio 516 via an interface antenna 526. The RBDS radio 516 receives the signals via a radio antenna 518 and reproduces the signals over one or more radio speakers 424. The interface 510 further includes a microphone 568 for receiving audio signals from a user and sending those signals to the wireless communication device 512 for transmission to the external cell 566.

The interface 510 also includes an RBDS transmitter 561 which, in response to audio output received from the wireless communication device 512, transmits digital command signals to the RBDS radio 516. The digital command signals may automatically turn on the RBDS radio 516 and/or adjust the frequency and volume to receive the signals from the wireless communication device via the radio frequency transmitter 560. The RBDS transmitter 561 eliminates the need for the user to adjust the radio before sending or receiving information from the wireless communication device 512.

Like the other embodiments of the present invention described above, the interface 510 is connectable to an external power source 542, such as an automobile battery, via a cigarette lighter plug receptacle 541 and a battery eliminator plug 556. The interface 510 (or alternatively the battery eliminator plug 556) includes a DC—DC converter 557 connected to a battery 544 of the wireless communication device 512 and the external power source 542 to provide power to the components of the interface 510 and, optionally, the wireless communication device 512.

The interface 510 may further optionally include a capacitor 575 coupled to the interface antenna 526 and the battery eliminator plug 556, as described in connection with the embodiment shown in FIG. 8. The interface 510 may also optionally include a speaker 572 and speaker amplifier 574 for temporarily reproducing audio signals received from the wireless communication device 512 before the RBDS radio 516 is properly adjusted. Further, the interface 510 is also compatible with any standard radio. (If the interface 510 is used with a standard radio, the RBDS transmitter 561 is not necessary).

Figure 10:
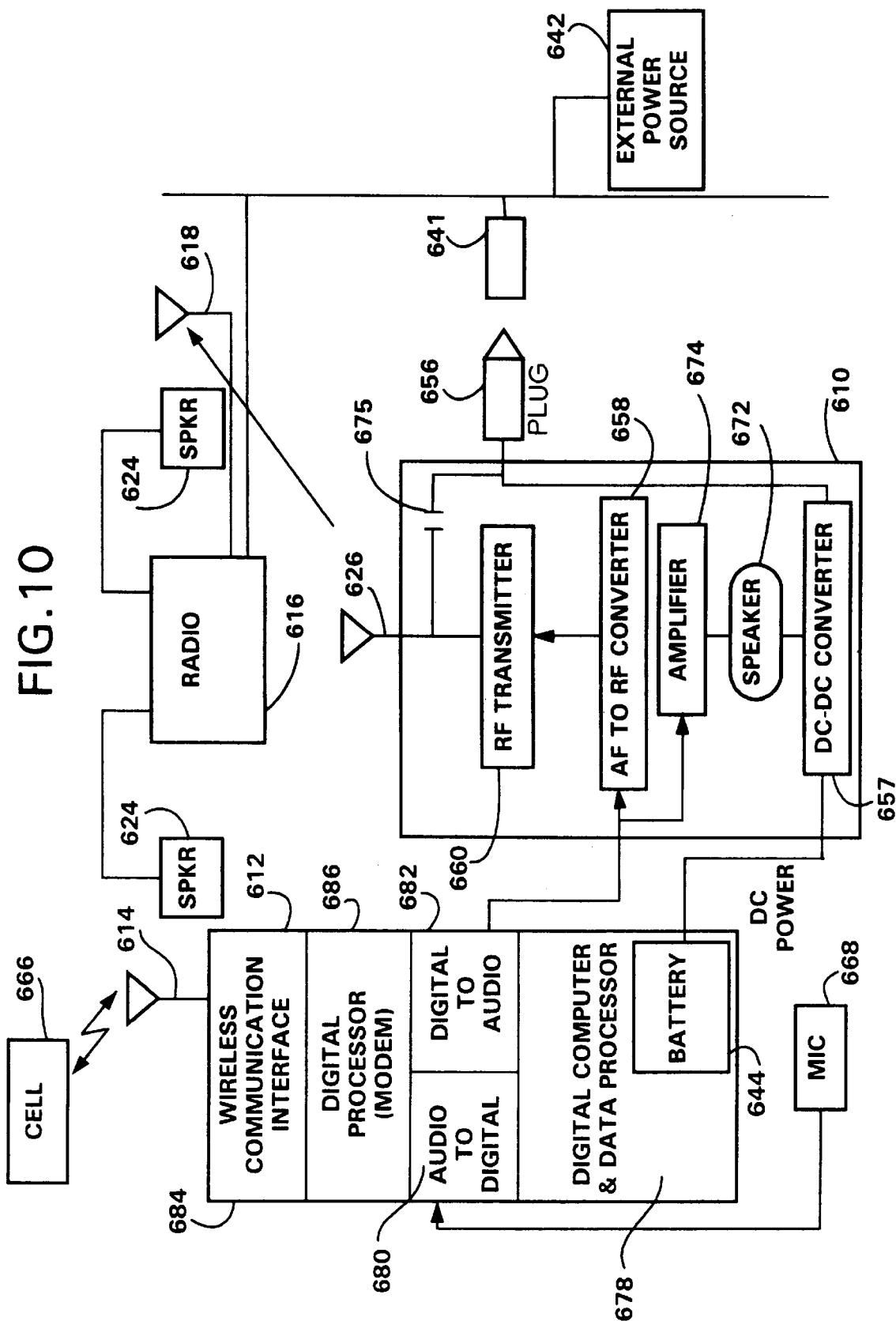
FIG. 10 is a block diagram of still another embodiment of the present invention including an interface for interfacing a digital computing device with a radio.

FIG. 10 is a block diagram of yet another embodiment of the present invention wherein an interface 610 is connectable to a digital computing device 612, such as a laptop computer and a modem, a personal communicator, or the like. Like the previously described embodiments of the present invention, the interface 610 includes a audio frequency to radio frequency converter 658 and a radio frequency transmitter 660 which transmit signals to a radio 616 via an interface antenna 626.

The interface 610 is connectable to an external power source 642, such as an automobile battery, via a cigarette lighter plug receptacle 641 and a battery eliminator plug 656. A DC—DC converter 657 is incorporated into the interface 610 or the battery eliminator plug 656 and may be connected to a battery 644 of the digital computing device 612 for supplying power from the external power source 642 to the interface 610 and the digital computing device 612. The interface 610 may also optionally include a speaker 672 and a speaker amplifier 674, as described in connection with the other embodiments. Further, as described in the embodiment of FIG. 8, the interface 610 may also include a capacitor 675 coupled to the interface antenna 626 and the battery eliminator plug 656.

The digital computing device 612 may comprise, for example, a laptop computer including a digital computer and data processor 678, an audio to digital converter 680 and a digital to audio converter 682. The digital computing device 612 may further comprise a wireless communication interface 684, such as a cellular phone, for communicating with an external cell 666 via an antenna 614, and a digital processor 686, such as a cellular modem, for processing signals transmitted to or received from the external cell 666.

A microphone 668 may be internal to or connected to the digital computing device 612 to receive outgoing voice signals from the user. The voice signals are converted to digital signals by the audio to digital converter 680 and are transmitted to the external cell 666 via the wireless communication interface 684. Alternatively, the microphone 668 may be incorporated into the interface 610.

Incoming signals received by the wireless communication interface 684 from the external cell 666 are converted to audio signals by a digital to audio converter 682. Similarly, output signals generated by the digital processor 686 or the digital computer and data processor 678 may be converted to audio signals by the converter 682. These audio output signals are provided to the audio frequency to radio frequency converter 658 of the interface 610, where they are converted to radio frequency signals and transmitted to the radio 616 by the radio frequency transmitter 660 for reproduction over one or more radio speakers 624.

Alternatively, components from the interface 610 and the digital computing device 612 could be integrated into a plug-in card for a laptop computer. Specifically, the plug-in card may include, for example, the wireless communication interface 684, the digital processor 686, and the radio frequency transmitter 660. Further, the interface 610 (or the integrated card) may include voice recognition circuitry to allow the user to completely control the digital computing device 612 hands-free.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which are within the scope of the appended claims is reserved.

It is claimed:

1. An interface connectable to a stand-alone external communication source for interfacing the source to a radio including a radio receiver and radio speaker, comprising:

a converter which converts incoming audio signals from the external communication source to radio frequency signals;

a transmitter which transmits the radio frequency signals to the radio receiver, wherein the audio signals are reproduced over the radio speaker; and an interface speaker which reproduces a signal generated by the external communication source when the source receives an incoming signal, wherein the interface is remote from the communication source and the communication source is capable of operating independently of the interface.

2. The interface of claim 1, further comprising a microphone which receives an outgoing voice signal and transmits the outgoing signal to the external communication source.

3. The interface of claim 1, wherein the interface is housed in a cradle capable of receiving the external communication source.

4. The interface of claim 1, wherein the interface is housed in a remote housing connectable to the external communication source.

5. The interface of claim 1, wherein the interface is connectable to a battery eliminator to supply power from an external power source to the external communication source.

6. The interface of claim 5, wherein the battery eliminator further comprises means for charging an internal battery of the external communication source when the device is not in use.

7. The interface of claim 1, wherein the interface is housed in an adapter plug connectable to an external power source to supply power to the external communication source.

8. The interface of claim 7, further comprising a battery eliminator for overriding an internal battery of the external communication source and a battery charger for charging an internal battery of the external communication source when the device is not in use.

9. The interface of claim 1, further comprising an antenna for transmitting the radio frequency signals from the transmitter to the radio receiver.

10. The interface of claim 9, further comprising a capacitor coupled between the antenna and an external power source which supplies power to the radio.

11. The interface of claim 1, wherein the radio is an RBDS radio and the interface further comprises an RBDS transmitter for transmitting a command signal to adjust the radio when a signal is received by the external communication source.

12. The interface of claim 11, wherein the RBDS transmitter transmits a command to adjust the radio when an outgoing signal is sent by the external communication source.

13. The interface of claim 1, further comprising means for transmitting incoming signal identification information from the external communication source to the radio and reproducing the information over the radio.

14. The interface of claim 13, further comprising a memory to store the incoming signal identification information.

15. The interface of claim 1, further comprising an annunciator which develops a tone when an incoming signal is received by the external communication source.

16. The interface of claim 15, further comprising means for delaying transmission of the incoming signal from the interface to the radio to allow for adjustment of the radio.

17. The interface of claim 1, further comprising voice recognition means to enable a user to control the external communication source through voice commands.

18. The interface of claim 1, further comprising voice recognition means and radio control means to enable a user to control the radio through voice commands.

19. The interface of claim 1, wherein the external communication source is a portable cellular phone.

20. The interface of claim 1, wherein the external communication source is a digital computing device.

21. The interface of claim 1, wherein the external communication source is a fixed cellular phone and the fixed cellular phone is interfaced to a portable cellular phone for increasing the power transmissions of the portable cellular phone.

22. An interface connectable between a portable cellular phone and a fixed cellular phone for interfacing the fixed phone to a radio including a radio receiver and a radio speaker, comprising:
    a transceiver which receives phone operation signals from the portable phone and transmits the signals to the fixed phone;
    a converter which converts incoming audio signals from the fixed phone to radio frequency signals;
    a transmitter which transmits the radio frequency signals to the radio receiver, wherein the audio signals are reproduced over the radio speaker; and
    an interface speaker which reproduces a signal generated by the fixed phone when an incoming signal is received from the external communications cell.

23. The interface of claim 22, further comprising a microphone which receives an outgoing voice signal and transmits the outgoing signal to the fixed phone.

24. The interface of claim 22, wherein the interface and the fixed phone are connectable to an external power source.

25. The interface of claim 22, wherein the interface is connectable to a battery eliminator to supply power from an external power source to the portable phone.

26. The interface of claim 25, wherein the interface is housed in a cradle capable of receiving the portable phone.

27. The interface of claim 25, wherein the interface is housed in a remote housing connectable to the portable phone.

28. The interface of claim 22, wherein the interface is housed in an adapter plug connectable to an external power source to supply power to the portable phone.

29. The interface of claim 22, further comprising voice recognition means to enable a user to control the portable phone through voice commands.

30. The interface of claim 22, wherein the radio is an RBDS radio and the interface further comprises an RBDS transmitter for transmitting a command to adjust the radio when the portable phone is in use.

31. A system for interfacing a portable cellular phone to a radio including a radio receiver and a radio speaker, comprising:
    a power converter which converts a signal between power levels; and
    an interface connectable to the cellular phone, wherein the interface includes
    a transceiver which communicates with the cellular phone and the power converter,
    a converter which converts an incoming audio signal received from the phone to a radio frequency signal,
    a transmitter which transmits the radio frequency signal to the radio receiver, wherein the audio signal is reproduced over the radio speaker, and
    an interface speaker which reproduces a signal generated by the cellular phone when the phone receives an incoming signal.

32. The system of claim 31, wherein the power converter comprises an external antenna for communicating with an external communications cell and an internal antenna for communicating with the interface.

33. The system of claim 32, wherein the power converter further comprises a transceiver which receives signals from the external communications cell and the interface and a repeater which amplifies the signals.

34. The system of claim 31, wherein the interface further comprises a microphone which receives an outgoing voice signal and transmits the signal to the cellular phone.

35. The system of claim 31, wherein the interface and power converter are connected to an external power source.

* * * * *